(12) United States Patent
Salle et al.

(10) Patent No.: US 10,057,183 B2
(45) Date of Patent: Aug. 21, 2018

(54) NETWORK RESOURCE MANAGEMENT

(71) Applicant: HEWLETT-PACKARD DEVELOPMENT COMPANY, L.P., Houston, TX (US)

(72) Inventors: Mathias Salle, San Francisco, CA (US); Wei-Wei Zhou, Shanghai (CN); Shi Xin, Shanghai (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 62 days.

(21) Appl. No.: 14/440,994

(22) PCT Filed: Dec. 7, 2012

(86) PCT No.: PCT/CN2012/086200
§ 371 (c)(1),
(2) Date: May 6, 2015

(87) PCT Pub. No.: WO2014/086043
PCT Pub. Date: Jun. 12, 2014

(65) Prior Publication Data
US 2015/0304234 A1 Oct. 22, 2015

(51) Int. Cl.
*G06F 15/173* (2006.01)
*H04L 12/923* (2013.01)
(Continued)

(52) U.S. Cl.
CPC ............ *H04L 47/762* (2013.01); *G06F 7/00* (2013.01); *G06F 9/5072* (2013.01); *H04L 47/781* (2013.01)

(58) Field of Classification Search
CPC ... H04L 47/762; H04L 47/781; H04L 12/923; H04L 12/911; G06F 7/00; G06F 9/5072
See application file for complete search history.

(56) References Cited

U.S. PATENT DOCUMENTS 8,261,295 B1 * 9/2012 Risbood ............... G06F 8/61
717/177
8,954,557 B2 * 2/2015 Gusev ............... G06F 9/5061
709/220

(Continued)

FOREIGN PATENT DOCUMENTS

CN 102004671 4/2011
IN 2752/CHE/2011 9/2011
(Continued)

OTHER PUBLICATIONS

"Appdynamics Application Management for the Cloud Generation"; http://www.appdynamics.com/solutions-cloud-computing.php; 10 pages.

(Continued)

*Primary Examiner* — Cheikh Ndiaye
(74) *Attorney, Agent, or Firm* — Fabian VanCott

(57) ABSTRACT

A method of network resource management comprising, with a processor, creating a model of an application, defining a number of substitution points within the model, expressing the substitution points as abstract models with a set of sub-types, and codifying a number of policies that express which sourcing option to use for each substitution point.

20 Claims, 10 Drawing Sheets

(51) Int. Cl.
*G06F 7/00* (2006.01)
*G06F 9/50* (2006.01)
*H04L 12/911* (2013.01)

(56) References Cited

U.S. PATENT DOCUMENTS

| | | |
|---|---|---|
| 2009/0228950 A1 | 9/2009 | Reed et al. |
| 2010/0223385 A1 | 9/2010 | Gulley et al. |
| 2011/0270857 A1* | 11/2011 | Bommireddipalli  G06F 17/30306 707/758 |
| 2012/0096149 A1 | 4/2012 | Sunkara et al. |
| 2012/0173709 A1 | 7/2012 | Li et al. |
| 2012/0180045 A1 | 7/2012 | Bhogal et al. |
| 2012/0271949 A1 | 10/2012 | Radhakrishnan et al. |
| 2013/0054776 A1* | 2/2013 | Kunze .................. G06F 9/5061 709/224 |
| 2014/0101300 A1* | 4/2014 | Rosensweig .......... G06F 9/5072 709/223 |
| 2015/0199197 A1* | 7/2015 | Maes ........................ G06F 8/71 717/122 |

FOREIGN PATENT DOCUMENTS

| | | |
|---|---|---|
| JP | 2011-186637 | 9/2011 |
| JP | 2012-168585 | 9/2012 |
| JP | 2012-173869 | 9/2012 |

OTHER PUBLICATIONS

Cole, A.; "Cloud Bursting Not Ready for Prime Time"; May 2, 2012; 3 pages.
Guo, T. et al.: "Seagull: Intelligent Cloud Bursting for Enterprise Applications"; Jun. 13-15, 2012; 6 pages.
Ohlhorst, F.J. et al.; "Bright Computing Targets Cloud Bursting"; May 9, 2012; 3 pages.
International Searching Authority, ISA/CN, International Search Report, dated Sep. 19, 2013. Application No. PCT/CN2012/086200 Filing date Dec. 7, 2012.
Communication pursuant to Article 94(3) EPC, EP Application No. 12889572.9, dated Feb. 17, 2017, 4 pages.
Cole, Arthur. ITBusinessEdge. Cloud Bursting Not Ready for Prime Time. May 2, 2012. http://www.itbusinessedge.com/cm/blogs/cole/cloud-bursting-not-ready-for-prime-time/?cs=50348, 7 pages.
Extended European Search Report; 12889572.9-1957/2929717; PCT/CN2012/086200; dated Jun. 16, 2016; 7 pages.
2012 USENIX Annual Technical Conference Jun. 13-15, 2012; https://www.usenix.org/conference/usenixfederatedconferencesweek/seagull-intelligent-cloud-bursting-enterprise-applications, 2 pages.
InformationWeek. Network Computing. Bright Computing Targets Cloud Bursting. May 8, 2012. http://www.networkcomputing.com/cloud-computing/bright-computing-targets-cloud-bursting/232901639, 8 pages.

\* cited by examiner

NETWORK RESOURCE MANAGEMENT

BACKGROUND

Cloud computing services have become increasingly available to individuals and business entities in order to allow those individuals or business entities to expand their information technology (IT) infrastructures and resources in a dynamic manner. These individuals and business entities often enter into contracts with the cloud services provider at times in which the individual's or business entity's internal IT infrastructures or resources are over-utilized or otherwise insufficient to accommodate an increase in network activity. This increase in network activity may be due to, for example, an increase in sells of their respective goods or services. Thus, an individual or business entity may take advantage of the economies of scale associated with the public and other forms of cloud computing services.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
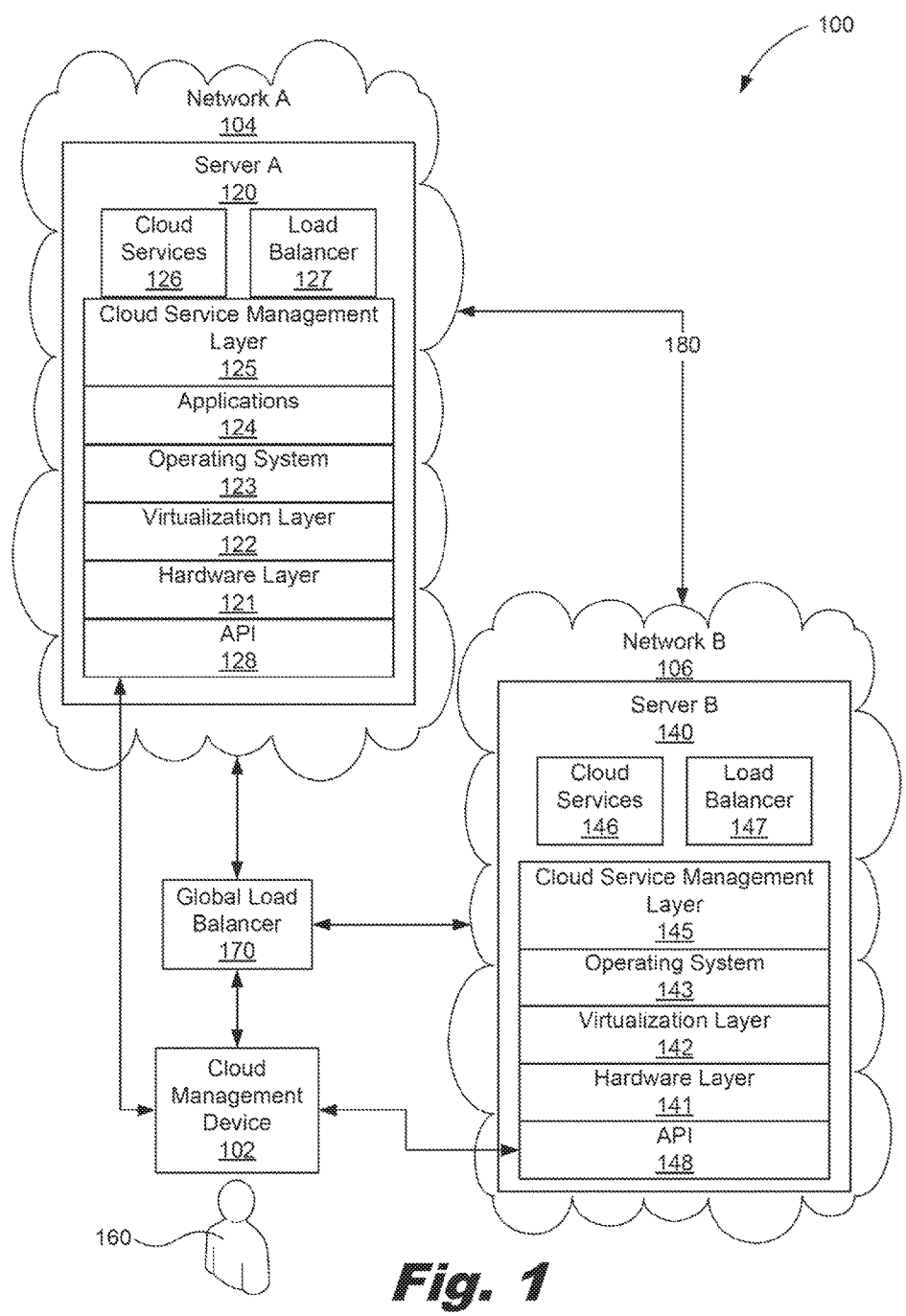
FIG. 1 is a block diagram of a system for cloud bursting based on substitution points and bursting policies, according to one example of the principles described herein.

The present systems and methods provide for network resource management. The methods may comprise, with a processor, creating a model of an application, defining a number of substitution points within the model, expressing the substitution points as abstract models with a set of sub-types, and codifying a number of policies that express which sourcing option to use for each substitution point. The methods may further comprise receiving a request to instantiate a model, applying a number of the policies to select a resource candidate, and acquiring resources of a selected candidate.

The present systems and methods provide for a cloud management device which may comprise a processor, and memory communicatively coupled to the processor. The cloud management device may further comprise a substitution module stored within the memory to, when executed by the processor, create a model of a to-be-scaled application and define a number of substitution points within the model. The cloud management device may further comprise a static binding policy creation module stored within the memory to, when executed by the processor, create a number of explicit statements defining a sub-type within a substitution point, and a dynamic binding policy creation module stored within the memory to, when executed by the processor, create a number of policies comprising a scoring function evaluated at runtime that informs a resource provider about a best sub-type to select.

The present systems and methods provide for a computer program product for managing network resources which may comprise a computer readable storage medium comprising computer usable program code embodied therewith. The computer usable program code comprises computer usable program code to, when executed by a processor, create a model defining a to-be-scaled application and define a number of substitution points within the model. The computer usable program code may further comprise, computer usable program code to, when executed by a processor, create a number of explicit statements defining a sub-type within a substitution point, and computer usable program code to, when executed by a processor, create a number of policies comprising a scoring function evaluated at runtime that informs a resource provider about a best sub-type to select.

As demonstrated above, it may be difficult for an individual or business entity to determine when it may be advantageous to purchase external cloud services or purchase more or less of those services. For example, an individual or business entity may not realize at what point such a purchase of external cloud services may be most economical for their underlying business activities. Certain environmental factors may be considered such as, for example, the market in which the external cloud services are to be use, the internal or private network on which the individual or business entity is currently utilizing and seeking to scale out from, the economical advantages of scaling out to an external cloud service versus remaining within the internal private network, among others.

Cloud bursting is a situation where at a given point it may be more economical to run additional workload on one or more external clouds or networks than on internal resources, and to trigger that shift from internal resource utilization to external network utilization on an on-demand basis. A spike in demand placed on an application within the internal resources may be handled dynamically by adding capacity provided by a third-party supplier in the external resource. The associated degree of coupling to the internal resources may be an aspect of cloud bursting a user wishes to control.

For example, an information technology (IT) organization could use cloud bursting to deploy a new release of an application for testing and evaluation purposes. In such a case, the tested application runs in the cloud and is not connected at all to internal resources. Similarly, a development project could use cloud bursting to provision its smoke tests triggered by their continuous build environment in order to preliminarily determine whether simple failures severe enough to reject a prospective software release exist. Use of cloud bursting thereby shifts capital expenditures to operational expenditures for their test bed.

In the above two situations, the cloud resources are loosely coupled with the internal IT resources. A cloud burst is tightly coupled to internal resources when the resources provisioned in the cloud require frequent data sharing and communication with the internal resources. Not all applications or application components lend themselves to cloud bursting. Whether tightly or loosely coupled, or whether the requested services are infrastructure or service level, cloud bursting may not be an action that is improvise when a spike occurs. Cloud bursting is an inherent part of a particular application design and a user's deployment model. The present systems and methods assist an administrator in determining which applications utilized within an internal network may be deployed in an external network using cloud bursting techniques, and how that particular application may be deployed within the external network.

As used in the present specification and in the appended claims, the term "cloud" is meant to be understood broadly as any network that delivers requested virtual resources as a service. In one example, a cloud network may provide a computing environment where users can have access to applications or computing resources, as services, from anywhere through their connected devices. These services may be provided by entities called cloud services providers. Examples of services that may be provided via a cloud network include infrastructure as a service (IaaS), platform as a service (PaaS), software as a service (SaaS), storage as a service (STaaS), security as a service (SECaaS), test environment as a service (TEaaS), and application program interface (API) as a service (APIaaS), among others. Throughout the present specification and in the appended claims, the term "network" may include the above-defined cloud networks, or any other form of network.

Further, as used in the present specification and in the appended claims, the term "public cloud" is meant to be understood broadly as a number of services provided by a service provider over a network that makes applications, storage, and other resources available to the general public. In one example, these services are offered by the service provider on a pay-per-use model. In this example, the public cloud service providers own and operate the infrastructure. In another example, the public cloud service provider offers access via a public network such as, for example, the Internet, and direct connectivity is not offered. An example of a cloud service provided within a public cloud may be AMAZON WEB SERVICES developed and sold as a service by Amazon.com, Inc., the RACKSPACE CLOUD web application hosting services developed and provided by Rackspace US, Inc., among others.

As used in the present specification and in the appended claims, the term "private cloud" is meant to be understood broadly as any cloud computing environment in which access is exclusively limited to an individual or a business entity. In one example, a private cloud may be any cloud infrastructure operated solely for a single individual or business entity. In one example, the private cloud is managed internally by the owner of the private cloud infrastructure. In another example, the private cloud is managed by a third-party and hosted internally or externally.

As used in the present specification and in the appended claims, the term "hybrid cloud" is meant to be understood broadly as any cloud computing environment that comprises a number of public cloud resources and a number of private cloud resources. In one example, a hybrid cloud comprises a number of cloud networks such as private clouds and public clouds that remain individual networks but are associated to offer a number of services.

As used in the present specification and in the appended claims, the term "scaling out" or similar language is meant to be understood broadly as any activity that initially allocates or consumes additional resources within a second cloud computing environment with respect to a first or original cloud computing environment in order to accommodate an increase in network activity. Similarly, as used in the present specification and in the appended claims, the term "scaling in" or similar language is meant to be understood broadly as any activity that releases, frees up, or discharges a portion of or the entire resources within the second cloud computing environment. Scaling out and scaling in may be generally referred to as "horizontal" scaling or "cloud bursting."

As used in the present specification and in the appended claims, the term "scaling up" or similar language is meant to be understood broadly as any activity that allocates or consumes additional resources within a cloud computing environment in order to accommodate an increase in network activity in that cloud computing environment. Similarly, as used in the present specification and in the appended claims, the term "scaling down" or similar language is meant to be understood broadly as any activity that releases, frees up, or discharges a portion of or the entire resources within that cloud computing environment. Scaling up and scaling down may be generally referred to as "vertical" scaling.

Even still further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Referring now to FIG. 1, a block diagram of a system (100) for cloud bursting based on substitution points and bursting policies, according to one example of the principles described herein is shown. FIG. 1 depicts a system (100) for scaling out or cloud bursting from a first network such as, for example, an internal or private network to a second network such as, for example, an external cloud network. In one example, the external cloud network is a public cloud supported by a public cloud service provider. The system (100) may comprise a cloud management device (102) that has access to a number of networks; network A (104) and network B (106). Although two networks (104, 106) are shown in FIG. 1, any number of networks (104, 106) may be communicatively coupled to the cloud management device (102). Even further, the networks (104, 106) may be communicatively coupled to each other via a direct communication line (180), for example, a public or private internet connection. For example, the networks may be connected via a virtual private network (VPN) available over a public network, or a leased line, among others.

In another example, the networks are cloud services networks as defined above. Throughout the present specification and drawings, network A (104) and network B (106) will be described as cloud services networks. However, any form of network may be employed in bringing about the objectives of the present systems and methods.

In one example, the cloud management device (102) may be separate from the networks (104, 106). In this example, the cloud management device may be controlled by a third party, and its functionality may be provided as a service to the owner of, for example, network A (104).

In another example, the cloud management device (102) may be incorporated into one of the networks (104, 106). In this example, an administrator (160) of the network (104, 106) into which the cloud management device (102) is incorporated may be tasked with using the cloud management device (102) to bring about the functionality provided by the cloud management device (102). Also, in this example, the cloud management device (102) may be provided as a computer program product as will be described in more detail below.

The networks (104, 106) may comprise a number of servers (120, 140). In the example, of FIG. 1, each network (104, 106) comprises one server (120, 140). However, each network (104, 106) may comprise any number of servers (120, 140). As shown in FIG. 1, each server comprises a hardware layer (121, 141) comprising, for example, a processor and memory, among other computer hardware devices to form a computing device.

The hardware layer (121, 141) supports a virtualization layer (122, 142). The virtualization layers (122, 142) within the servers (120, 140) provide an abstraction layer from which the virtual entities such as, for example, virtual servers; virtual storage: virtual networks, including virtual private networks; virtual applications and operating systems; and virtual clients, among others may be instantiated. Specifically, a number of operating systems (123, 143) may be executed by a processor in the hardware layers (121, 141). Although one operating system (123, 143) is shown within the servers (120, 140) of FIG. 1, any number of virtual machines comprising their own respective operating systems and any number of applications may be instantiated within the servers (120, 140) to provide a user or a number of different users access to these virtual resources.

A number of applications (124) may also be executed by a processor in the hardware layer (121) of server A (120). Although only one application (124) is depicted, any number of applications may be stored and executed on server A (120). In one example, and throughout the present disclosure, server A (120) may be experiencing an over-utilization of its resources vis-à-vis the application (124) due to an increase in, for example, customers making requests to server A (120) associated with the services provided by the application (124). As described above, an administrator (160) may desire to vertically and/or horizontally scale resources. In this scenario, the resources provided by server B (140) on network B (106) may be utilized by providing the application (124) on server B (140) and directing all or a portion of the network transactions to the instance of the application present on server B (140).

In one example, the applications (124, 144) executed on the servers (120, 140) may be executed on the same or different types of respective operating systems (123, 143). Each of the applications (124, 144) and their respective operating systems (123, 143) may be associated with additional virtual resources supported by the hardware layers (121, 141) such as, for example a processor, memory, network adapters, and data storage device, among others.

The cloud service management layers (125, 145) within the networks (104, 106) provide management of cloud services residing on the servers (120, 140) within the networks (104, 106). In one example, the cloud service management layers (125, 145) provision resources. Resource provisioning provides dynamic procurement of computing resources and other resources that are utilized to perform tasks within the cloud computing environment. In another example, the cloud service management layers (125, 145) provide service level management where cloud computing resources are allocated such that contracted service levels are met. In still another example, the cloud service management layers (125, 145) perform a combination of the above services.

A number of cloud services (126, 146) are supported by the servers (120, 140) within the networks (104, 106). As described above, examples of services that may be provided via a cloud network include infrastructure as a service (IaaS), platform as a service (PaaS), and software as a service (SaaS). Thus, the applications (124, 144), operating systems (123, 143), cloud service managements layer (125, 145), and hardware layer (121, 141) may be used to provide a user with a number of these types of services. In one example, the cloud services (126, 146) support an underlying service in which the user or purchaser of the cloud services (126, 146) is engaged. For example, the user or purchaser of the cloud services (126, 146) may be engaged in selling goods or services themselves, and do so through the cloud services (126, 146) provided by the owner and operator of network B (106).

In the present example, for the purposes of simplicity in illustration, the cloud management device (102), server A (120), and server B (140) are separate computing devices communicatively coupled to each other through their respective networks (104, 106) and the cloud management device (102). However, the principles set forth in the present specification extend equally to any alternative configuration. As such, alternative examples within the scope of the principles of the present specification include, but are not limited to, examples in which the cloud management device (102), server A (120) and server B (140) are implemented by the same computing device, examples in which the functionality of the cloud management device (102), server A (120) or server B (140) is implemented by multiple interconnected computers, and examples in which cloud management device (102), server A (120) and server B (140) communicate directly through a bus without intermediary network devices.

In another example, the cloud management device (102) may be implemented on either server A (120) or server B (140) in order to manage the scaling in, scaling out, scaling up, or scaling down of cloud services.

In still another example, the cloud management device (102) may be implemented by a third party as a service. In this example, the third party may be a organization or business entity such as, for example. Hewlett Packard with its developed CLOUDSYSTEM cloud network infrastructure that assists in building private, public, and hybrid cloud computing environments by combining storage, servers, networking, and software.

In one example, a global load balancer (170) may be communicatively coupled to the cloud management device (102) as well. The global load balancer (170) comprises a number of policies that assign transaction requests to the networks (104, 106) or to a server (120, 140) within the networks (104, 106). The load balancers (127, 147) of network A (104) and network B (106) also comprise a number of policies that assign transaction requests to a server (120, 140) within the networks (104, 106).

The cloud management device (102) updates policies within the load balancers (127, 147) of network A (104) and network B (106) and the global load balancer (170) in order to receive in-coming transaction (HTTP) requests and assign those transaction requests to a server (120, 140) within the networks (104, 106) of which the server (120, 140) is a part. In one example, the processor (FIG. 2, 202) of the cloud management device (102) has access to and may control the global load balancer (170). The global load balancer (170) directs new transaction requests to network B (106) instead of network A (104) or visa versa as will be described below in connection with cloud bursting and vertical scaling.

As mentioned above, the system (100) may further comprise a cloud management device (102). In one example, the cloud management device (102) is a third party device run separate from the networks (104, 106). In another example, the cloud management device (102) is implemented or associated with the private network A (104). The cloud management device (102) provides access to the cloud computing environment created by the networks (104, 106) for consumers and system administrators (160), and assists and defines the horizontal and vertical scaling of cloud services as will be described in more detail below.

Figure 2:
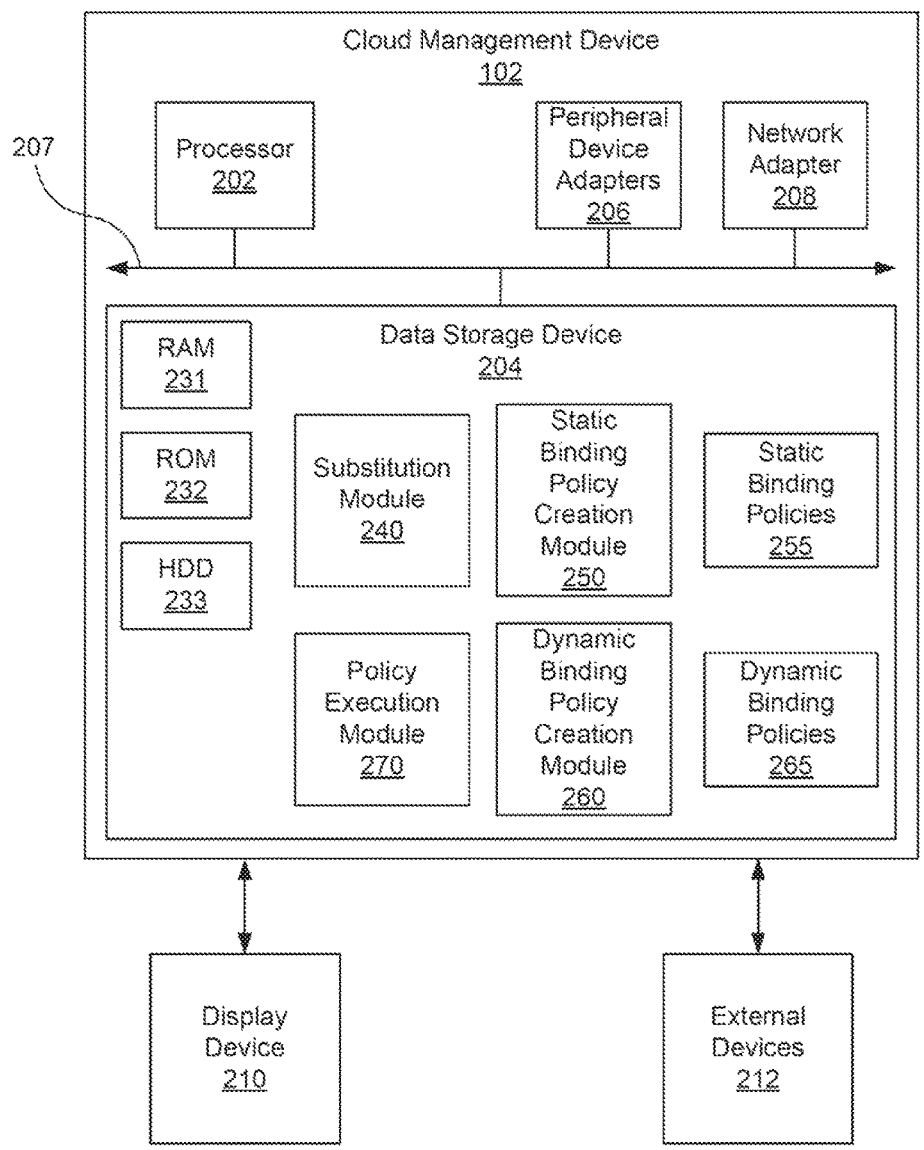
FIG. 2 is a block diagram of the cloud management device of FIG. 1, according to one example of the principles described herein.

FIG. 2 is a block diagram of the cloud management device (102) of FIG. 1, according to one example of the principles described herein. The cloud management device (102) is a computing device that performs the methods described herein. In another example, the cloud management device (102) is a mobile computing device such as, for example, a mobile phone, smart phone, personal digital assistant (PDA), or a laptop computer with the capability of performing the methods described herein. In another example, the cloud management device (102) is a desktop computing device.

In another example, the cloud management device (102) may be provided as a service by a cloud computing resource provider, an administrator, or a third party, among other entities. In this example, the cloud management device (102) may be executed on a single computing device, or may be distributed and executed across a number of devices located at any number of locations.

To achieve its desired functionality, the cloud management device (102) comprises various hardware components. Among these hardware components may be a number of processors (202), a number of data storage devices (204), a number of peripheral device adapters (206), and a number of network adapters (208). These hardware components may be interconnected through the use of a number of busses and/or network connections. In one example, the processor (202), data storage device (204), peripheral device adapters (206), and a network adapter (208) may be communicatively coupled via bus (207).

The processor (202) may include the hardware architecture to retrieve executable code from the data storage device (204) and execute the executable code. The executable code may, when executed by the processor (202), cause the processor (202) to implement at least the functionality of managing the scaling in, scaling out, scaling up, and scaling down of cloud network services according to the methods of the present specification described herein. In the course of executing code, the processor (202) may receive input from and provide output to a number of the remaining hardware units.

The data storage device (204) may store data such as executable program code that is executed by the processor (202) or other processing device. As will be discussed, the data storage device (204) may specifically store a number of applications that the processor (202) executes to implement at least the functionality of managing the scaling in, scaling out, scaling up, and scaling down of cloud network services.

The data storage device (204) may include various types of memory modules, including volatile and nonvolatile memory. For example, the data storage device (204) of the present example includes Random Access Memory (RAM) (231), Read Only Memory (ROM) (232), and Hard Disk Drive (HDD) memory (233). Many other types of memory may also be utilized, and the present specification contemplates the use of many varying type(s) of memory (130) in the data storage device (204) as may suit a particular application of the principles described herein. In certain examples, different types of memory in the data storage device (204) may be used for different data storage needs. For example, in certain examples the processor (202) may boot from Read Only Memory (ROM) (232), maintain nonvolatile storage in the Hard Disk Drive (HDD) memory (233), and execute program code stored in Random Access Memory (RAM) (231).

Generally, the data storage device (204) may comprise a computer readable storage medium. For example, the data storage device (204) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. In another example, a computer readable storage medium may be any non-transitory medium that can contain, or store a program for use by or in connection with an instruction execution system, apparatus, or device.

The hardware adapters (206, 208) in the cloud management device (102) enable the processor (202) to interface with various other hardware elements, external and internal to the cloud management device (102). For example, peripheral device adapters (206) may provide an interface to input/output devices, such as, for example, display device (210), to create a user interface and/or access network A (FIG. 1, 104), network B (FIG. 1, 106), and other external devices (212). The display device (210) may be provided to allow a user (FIG. 1, 160) to interact with and implement the functionality of the cloud management device (102).

The peripheral device adapters (206) may also create an interface between the processor (202) and a printer, the display device (210), or other media output device. The network adapter (208) may provide an interface to the networks (104, 106), thereby enabling the transmission of data between the cloud management device (102), global load balancer (170), and networks A and B (104, 106).

The cloud management device (102) further comprises a number of modules used in determining when and how to vertically and horizontally scale computing resources within and between networks A and B (104, 106). The various modules within the cloud management device (102) may be executed separately. In this example, the various modules may be stored as separate computer program products. In another example, the various modules within the cloud management device (102) may be combined within a number of computer program products; each computer program product comprising a number of the modules.

The cloud management device (102) may comprise a substitution module (240) to, when executed by the processor (202), create an model of an application's (FIG. 1, 124, 144) design requirements, and determine a number of substitution points within the model. The substitution points are used to indicate to a user or administrator (160) what portions of the model may be substituted with specific sub-types of that portion of the model. The substitution module (240) also binds a number of substitution points within an application definition or model such as the dependency graphs depicted in FIGS. 3 through 5. In one example, the substitution module (240) is stored within the data storage device (204) of the cloud management device (102), and is accessible and executable by the processor (202).

Turning again to FIG. 1, and having described the cloud management device (102) and the servers (120, 140) of networks A and B (106, 106), the cloud management device (102) interfaces with network A (104) and network B (106). In one example, this interface is achieved via a number of application programming interfaces (APIs) (128, 148).

Figure 3:
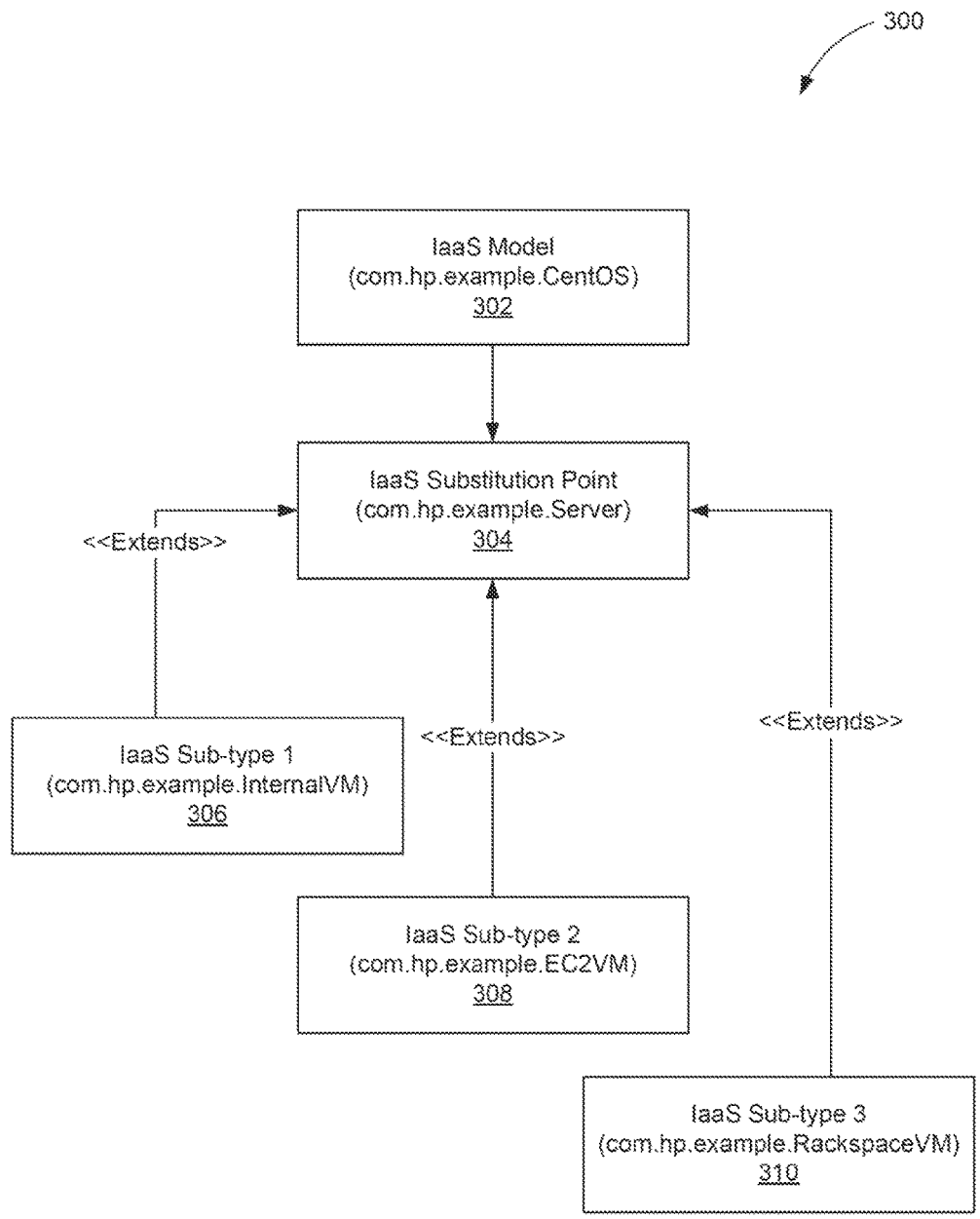
FIG. 3 is a block diagram of an application model or dependency graph within an infrastructure as a service (IaaS) scenario, according to an example of the principles described herein.

FIG. 3 is a block diagram of an application model or dependency graph (300) within an infrastructure as a service (IaaS) scenario, according to an example of the principles described herein. In one example, the substitution module (240) may create the dependency graph (300) of FIG. 3. In the example of FIG. 3, block 302 of the dependency graph (300) identifies an IaaS model created by the substitution module (FIG. 2, 240). In this example, the substitution module (240) has determined either autonomously or through data received from an administrator (160) that the application that is to be scaled requires a particular operating system. Examples of operating systems that the substitution module (FIG. 2, 240) may identify may include, for example, WINDOWS® operating system developed and distributed by Microsoft Corporation; UBUNTU® operating system developed and distributed by Canonical Ltd.; UNIX® operating system developed by American Telephone and Telegraph Company and distributed as an open source software package; LINUX® Unix-based operating system developed and distributed as an open source software package; ANDROID® Linux-based operating system developed and distributed by Google. Inc.; BERKELEY SOFTWARE DISTRIBUTION (BSD) Unix-based operating system developed and distributed by the Computer Systems Research Group (CSRG) of the University of California, Berkeley; iOS® operating system developed and distributed by Apple Inc.; Mac OS X operating system developed and distributed by Apple Inc.; and Community Enterprise Operating System (CentOS) Unix-based operating system developed by Red Hat, Inc. and distributed as an open source software package, among many others.

In the example of FIG. 3, the substitution module (FIG. 2, 240) has determined that the application requires a CentOS Unix-based operating system as indicated in block (302). The substitution module (FIG. 2, 240) identifies, at block 304, an IaaS substitution point for a server device. At this point, the substitution module (FIG. 2, 240) identifies a number of sub-types of servers at blocks 306, 308, and 310. The statement "<<Extends>>" in FIG. 3 indicates the sub-types of the base device (e.g., a server) that are available to the user as options for that device. The number and kinds of sub-types depends on what types of base devices the application is constrained to work with.

The sub-types of servers that may be provided by cloud network service providers may include, for example, an internal virtual machine (VM) such as a virtual machine present on server A (FIG. 1, 120) on network A (104). Other examples of sub-types of servers may include a number of external VMs such as a virtual machine present on server B (FIG. 1, 140) on network B (106) such as an ELASTIC COMPUTER CLOUD (EC2) cloud computing platform developed and offered by Amazon.com, Inc. or THE RACKSPACE CLOUD cloud computing platform developed and offered by RackSpace US, Inc., among many others. The examples of servers depicted in FIG. 3 are not exhaustive.

A dependency graph like the dependency graph (300) of FIG. 3 may be used to determine any number of substitution points applicable to any number of applications that could potentially be scaled out to another network in a cloud bursting operation. Other computing devices such as processors, load balancers, memory devices, peripheral device adaptors, network adaptors, and display devices, among other hardware devices offered as infrastructure in an IaaS computing service environment may also act as substitution points that are identified by the substitution module (FIG. 2, 240) within the dependency graph, and from which sub-types are presented as options provided by the various IaaS service providers.

Figure 4:
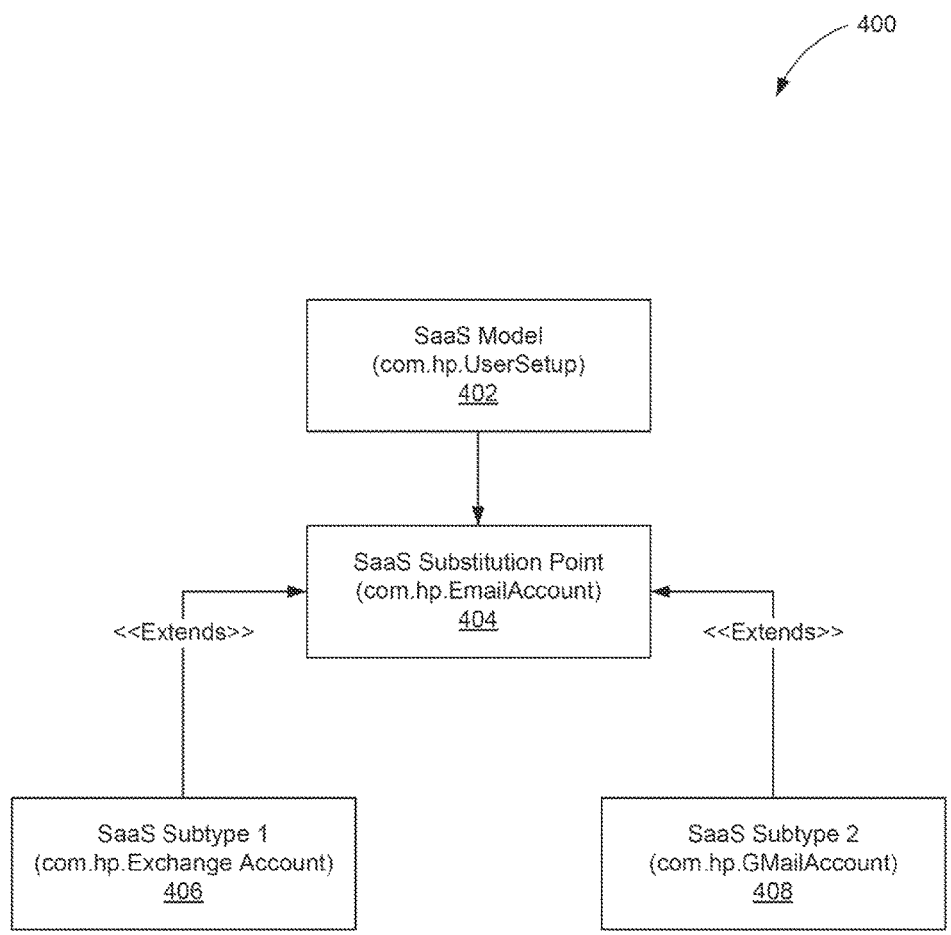
FIG. 4 is a block diagram of an application model or dependency graph within a software as a service (SaaS) scenario, according to an example of the principles described herein.

FIG. 4 is a block diagram of an application model or dependency graph (400) within a software as a service (SaaS) scenario, according to an example of the principles described herein. In one example, the substitution module (240) may create the dependency graph (400) of FIG. 4. In the example of FIG. 4, block 402 of the dependency graph (400) identifies an SaaS model created by the substitution module (FIG. 2, 240). In the example of FIG. 4, a software package is provided as a service that assists an administrator (160) in setting up a user with an email account. In this example, the substitution module (240) has determined either autonomously or through data received from an administrator (160) that the user is to be associated with a particular email account.

In the example of FIG. 4, the substitution module (FIG. 2, 240) has identified an SaaS substitution point at block 404. At this point, the substitution module (FIG. 2, 240) identifies a number of sub-types of email accounts available to the user at blocks 406 and 408. The statement "<<Extends>>" in FIG. 4 indicates the sub-types of the base application (e.g., an email account service) that are available to the user as options for that base application. The number and kinds of sub-types depends on what types of base applications the system is constrained to work with.

The sub-types of email accounts that may be provided by cloud network service providers may include, for example, EXCHANGE SERVER email account developed and distributed by Microsoft Corporation and GMAIL email account services developed and distributed by Google Inc. The examples of email account services depicted in FIG. 4 are not exhaustive.

As similarly described above in connection with FIG. 3, a dependency graph like the dependency graph (400) of FIG. 4 may be used to determine any number of substitution points applicable to any number of applications that could potentially be scaled out to another network in a cloud bursting operation. Other software packages such as operating systems, calendaring software packages, word processing software packages, internet purchasing software packages, and security software packages, among other software packages offered as software packages in an SaaS computing service environment may also act as substitution points that are identified by the substitution module (FIG. 2, 240) within the dependency graph, and from which sub-types are presented as options provided by the various SaaS service providers.

Figure 5:
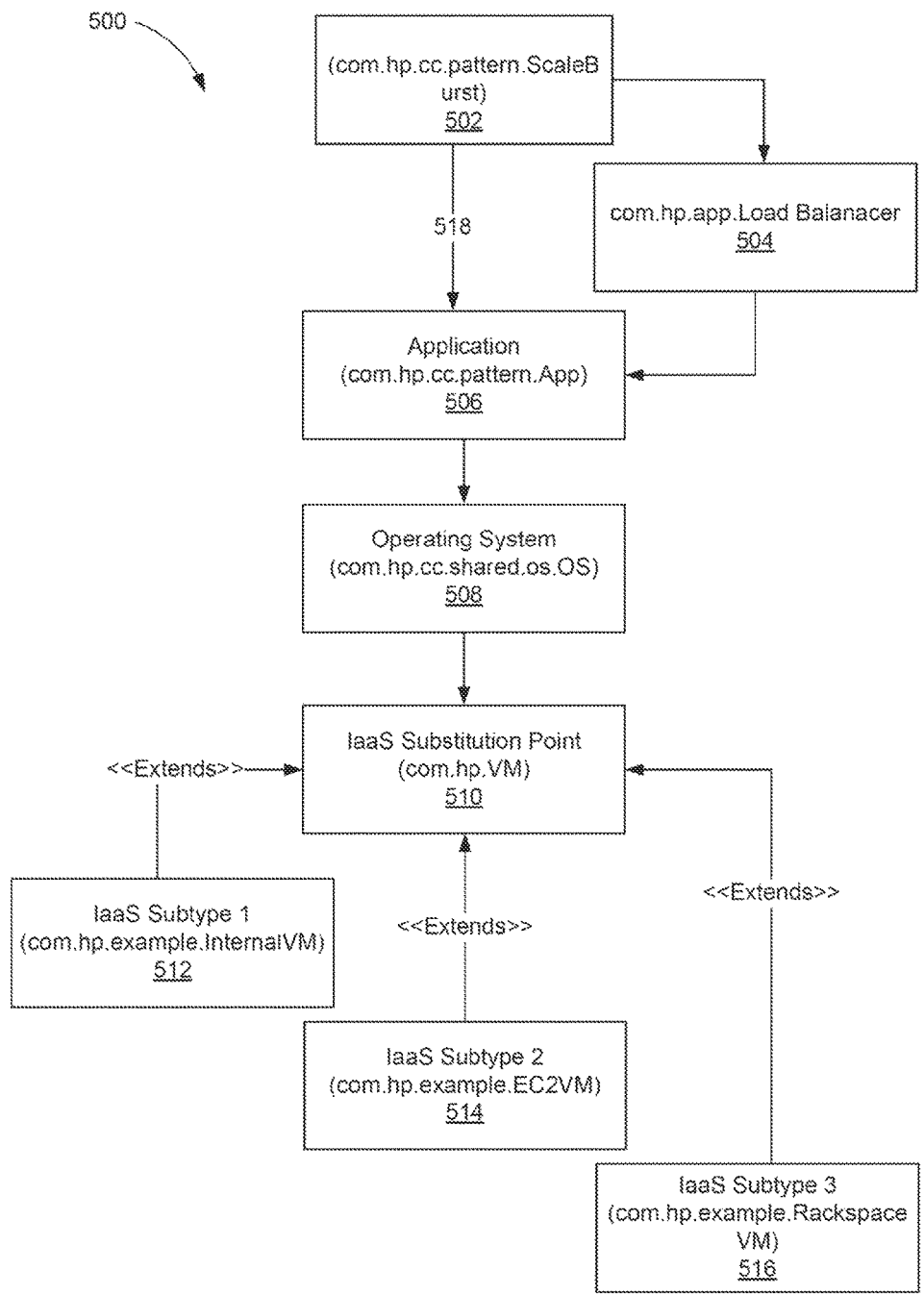
FIG. 5 is a block diagram of an application model or dependency graph depicting a scale point and a substitution point, according to an example of the principles described herein.

Turning now to FIG. 5, a block diagram of an application model or dependency graph (500) depicting a scale point (518) and a substitution point (510), according to an example of the principles described herein. FIG. 5 describes a cloud burst scenario where an increase in network activity within, for example, network A (104), leads to a horizontal scaling of resources into another network such as, for example, network B (106). At block 504, a number of load balancers such as the global load balancer (170) and the load balancers (127, 147) of the networks (104, 106) are updated and the load balancers (127, 147, 170) are indicated as being a required computing device within the scale bursting sce-nario. The application (506) to be horizontally scaled from network A (104) to network B (106) is represented at block 506.

A scale point (518) is also indicated in the dependency graph (500) as a point in network usage where the cloud burst scenario takes place. In one example, a range cardi-nality expressed as, for example, "variation initnb is [1 . . . 20]" and "variation maxnb is [1 . . . 20]" which are references to variables expressed in the model (500). These range cardinality expressions are used to determine when to perform a horizontal scaling of an application, and how many instances (e.g., between 1 and 20) of the application may be scaled out to other networks.

In the above example, a maximum of 20 instances and a minimum of 1 instance of the application may be scaled out to other networks upon the initiation of the horizontal scaling process. This range cardinality is merely an example. In other examples, an administrator (160) may desire that horizontal scaling be initiated when it is determined that at least 2 additional instances of the application are to be horizontally scaled to another network. In this manner, the administrator (160) can be sure that the horizontal scaling will be effective with regard to alleviating network overuti-lization within the internal network and cost in obtaining the resources available on the external network as purchased from the cloud computing resource provider. When the variables defined within the range cardinality are met, hori-zontal scaling or cloud bursting is commenced, and a number of applications, each with their own individual operating systems, virtual machines, and other devices and environments are acquired from the cloud computing resource provider.

The dependency graph (500) further depicts dependencies relied on by each instantiation of the application (block 506) including an operating system (block 508) and a virtual machine (510). As similarly described above, a substitution point may be determined to exist at any point within the dependency graph (500) as determined by the substitution module (FIG. 2, 240). In the example of FIG. 5, a substi-tution point exists at block 510 in connection with the virtual machine (VM) that is used to run the application (block 506) and its associated operating system (508). The IaaS sub-types available as VMs in this example include an internal VM (block 512), an EC2 VM (block 514), and a RackSpace VM (block 516).

In connection with FIGS. 3 through 5, a dependency graph is created for each instance of horizontal scaling of an application. In this manner, each time an application being executed on an internal network such as network A (FIG. 1, 104), and an instance of that application is to be horizontally scaled out to an external network such as network B (FIG. 1, 106), the substitution module (FIG. 2, 240) of the cloud management device (102) creates an model or dependency graph of the application's (FIG. 1, 124, 144) design require-ments, and determines a number of substitution points within the model or dependency graph. Other modules (250, 260, 270) stored within the cloud management device (102) are then executed by the processor (202) in order to create and execute policies that determine what types of services and devices are to be utilized at the substitution points and produce a number of matching cloud service providers with the cloud environment requirements provided by the poli-cies.

Turning again to FIG. 2, the cloud management device (102) may further comprise a static binding policy creation module (250) to, when executed by the processor (202), create a number of binding statements of the form abstract model==sub-type. The static binding policy creation module (270) associates the binding statements at runtime with a provisioning request made to a resource provider from whom the administrator (160) may desire to receive cloud computing services from. The provisioning request informs a runtime system to use the specified sub-type in place of the abstract model when scaling from, for example, a private network such as Network A (FIG. 1, 104) to a public network such as network B (FIG. 1, 106).

Still further, the cloud management device (102) may comprise a dynamic binding policy creation module (260) to, when executed by the processor (202), create a number of policies providing a scoring function evaluated at runtime that informs the resource provider about the best sub-type to select at the time the request is processed. For example, an administrator (160) may request that if the aggregate internal hypervisor capacity within the system (100) is below a threshold, then the system (100) should use either an EC2 VM or a RACKSPACE VM, but if aggregate internal hypervisor capacity within the system (100) is above the threshold, the system (100) should use an internal VM. In still another example, the administrator (160) may also specify that an equal distribution across the RACKSPACE server and EC2 server be maintained so that the scaling out of resources is evenly distributed across cloud service pro-viders.

Even still further, the cloud management device (102) may comprise a policy execution module (270) to, when executed by the processor (202), compile a number of rules to create a number of policies, and execute the policies to filter out and determine a number of resource candidates that match the constraints provided by the policies.

Figure 6:
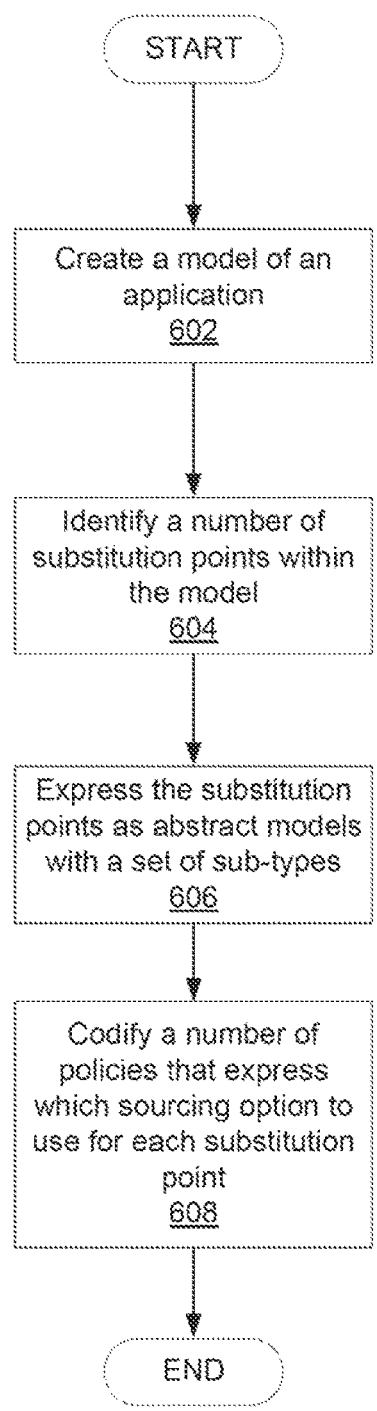
FIG. 6 is a flowchart showing a method for managing network resources, according to one example of the principles described herein.

The methods by which the processor (202) of the cloud management device (102) utilizes the various hardware and software elements of the cloud management device (102) to dynamically scale computing resources between two or more networks will now be described in more detail in connection with FIGS. 6 through 10. FIG. 6 is a flowchart showing a method for managing network resources, accord-ing to one example of the principles described herein. The method described in FIG. 6 is performed once, and the outcome may be leveraged for future instances of horizontal scaling. Further, the method of FIG. 6 may be referred to as a design time that is performed before a runtime. The method may begin with the processor (FIG. 2, 202) execut-ing the substitution module (240) to create (block 602) a model of an application. In one example, the model is captured as a dependency graph in which FIGS. 3 through 5 are examples. The substitution module (240) identifies (block 604) a number of substitution points within the model of the application.

The substitution module (240) expresses (block 606) the substitution points as abstract models with a set of sub-types that represent available sourcing options. The system (100), using the static binding policy creation module (FIG. 2, 250) and the dynamic binding policy creation module (FIG. 2, 260), codifies (block 608) a number of policies that express which sourcing option to use for each substitution point. In this manner, block 608 will act to bind the substitution points within the abstract model at runtime.

In one example, the policies may be expressed based on information contained within network A (104), network B (106), the cloud management device (102), or a combination thereof. In this example, the overall system (100) may receive input regarding how the policies should be expressed from a network from which scaling is to occur, a system into which scaling is occur, another device, or combinations thereof.

There are two types of policies; static binding policies and dynamic binding policies. Static binding policies are definitive selections of specific devices or services that may be made autonomously or by an administrator (FIG. 1, 160) prescribing a number of particular devices or services. For example, the system (100) or the administrator (160) may specify that the server must be a server that supports a RackSpace VM. In the example where the administrator specifies the devices or services, this information may be manually entered by the administrator (160) via a number of user interfaces displayed on the display device (FIG. 2, 210).

Dynamic binding policies are codified rules that rank the various devices or services based on their fitness or a best score based on a particular purpose or situation. For example, the system (100) may select an Exchange Server email account before a Gmail or Hotmail email account based on a user's needs. As another example, the system (100) may select a particular sub-type of VM from the cheapest cloud computing service provider such as AMAZON WEB SERVICES developed and provided by Amazon.com Inc. or cloud computing services developed and provided by Microsoft Inc., among many other cloud computing service providers.

Figure 7:
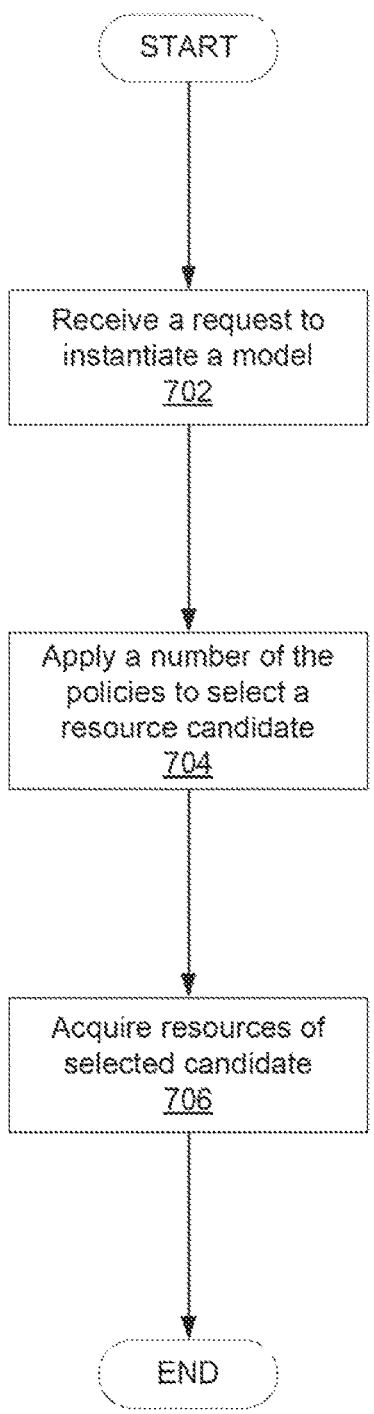
FIG. 7 is a flowchart showing method for managing network resources, according to another example of the principles described herein.

FIG. 7 is a flowchart showing method for managing network resources, according to another example of the principles described herein. The method described in FIG. 7 is performed for every instance of horizontal scaling of an application and is referred to as a runtime process that is performed after the design time described above in connection with FIG. 6.

The method may begin with the processor (FIG. 2, 202) receiving (block 702) a request to instantiate a model. This request is a request to horizontally scale the application to an external network such as Network B (106). The policy execution module (270) then applies (block 704) a number of the policies to select a resource candidate. In one example, the policies are those policies codified at block 608 of FIG. 6. Thus, the policies bind the substitution points within the abstract model. Block 704 comprises informing a number of cloud computing provisioning systems that provide the resource candidates that the substitution point of the abstract model will be substituted by a sub-type of the device or service at that substitution point.

The method of FIG. 7 further comprises acquiring (706) resources of the selected candidate. In one example, only one candidate is returned at block 704. In this example, the system (100) chooses that one candidate.

In another example, more than one candidate may be returned. In this example, more than one candidate may be filtered by the system that match the criteria set forth by the rules and policies. The administrator may choose from any of the multiple candidates returned.

The outcome of FIGS. 6 and 7 is a list of cloud computing service providers and those providers' resources that match the criteria set forth by the static binding policies and dynamic binding policies. For example, if the static binding policies and dynamic binding policies determine that the application (124) of network A (104) that is to be horizontally scaled to an external network requires a specific networking environment, then the system (100) will filter out the cloud computing service providers and their respective services and infrastructure they provide that match the criteria set forth by the static binding policies and dynamic binding policies. The specified networking environment may include the application's required computing devices such as, for example, an operating system, a virtual machine, a server, among other computing devices. The specified networking environment may also include these computing devices' specifications including, for example, memory capacity, memory type, and central processing unit specifications, among other computing device specifications.

The specified networking environment may also include services provided by the cloud computing service provider such as payment services that users of the application as implemented on the external network will use in, for example, purchasing the goods or services that the application provides to those users. Any number and combination of static binding policies and dynamic binding policies may be used to horizontally scale the application into the external network B (106) provided network B (106) meets the criteria set by the static binding policies and dynamic binding policies.

Figure 8:
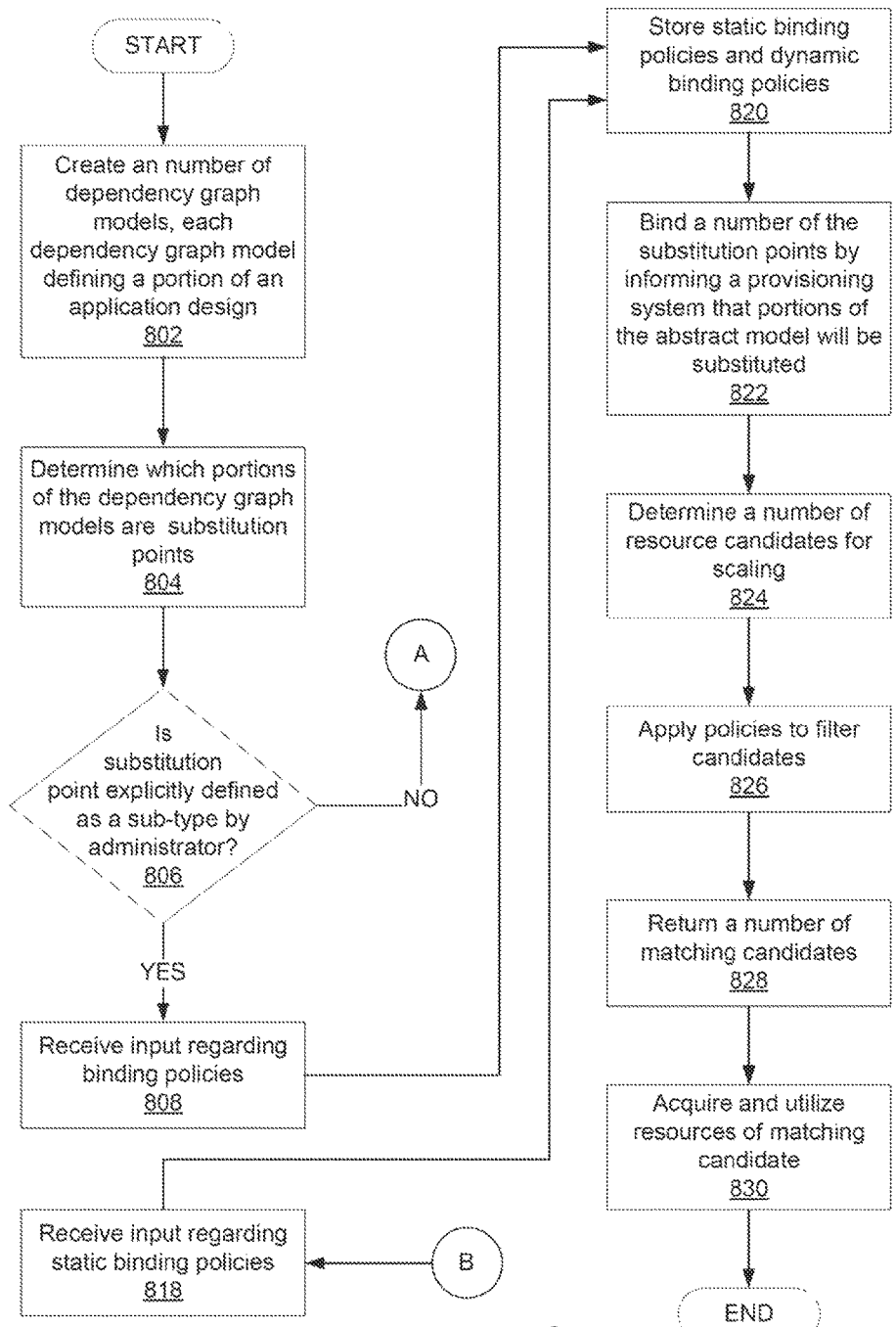
FIGS. 8 and 9 comprise a flowchart showing a method for managing network resources, according to another example of the principles described herein.
Figure 9:
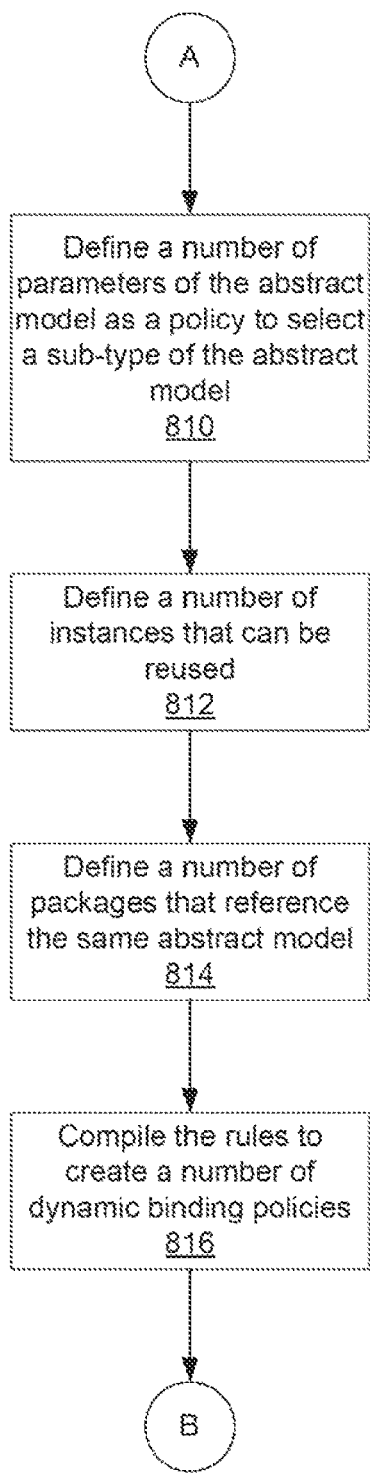

FIGS. 8 and 9 comprise a flowchart showing a method for managing network resources, according to another example of the principles described herein. The method of FIGS. 7 and 8 detail the methods of FIGS. 6 and 7, and may begin by the processor (202) executing the substitution module (FIG. 2, 240) to create (block 802) a number of dependency graph models, each dependency graph model defining a portion of an application design. The substitution module (FIG. 2, 240) determines (block 804) which portions of the dependency graph models are substitution points. Thus, at block 704, the substitution module (FIG. 2, 240) determines which portions of dependency graph model such as those depicted in FIGS. 3 through 5 are amendable to substitution.

The system determines (block 806) whether the substitution point is explicitly defined as a sub-type by an administrator. As described above, static binding policies and dynamic binding policies are used to filter potential cloud computing service providers to find a number of cloud computing service providers that meet the criteria defined by the static binding policies and dynamic binding policies. The static binding policies are created using the static binding policy creation module (250) executed by the processor (202). The static binding policy creation module (250) may, when executed by the processor (202) cause a number of user interfaces to appear on the display device (210) for an administrator to interact with and create static binding policies.

Similarly, the dynamic binding policies are created using the dynamic binding policy creation module (260) executed by the processor (202). The dynamic binding policy creation module (260) may, when executed by the processor (202) cause a number of user interfaces to appear on the display device (210) for an administrator to interact with and create dynamic binding policies.

If a substitution point is explicitly defined as a sub-type by the administrator (block 806, determination YES), then the policy is a static binding policy, and the processor (202) receives (block 808) as input the static binding policy. If the substitution point is not explicitly defined as a sub-type by the administrator (block 806, determination NO), then the policy is a dynamic binding policy, and the system (100) defines (block 810) a number of parameters of the abstract model as a policy to select a sub-type of the abstract model. At block 612, the processor (FIG. 2, 202) defines a number of instances of application (124) deployment within the external network that can be reused. Thus, block 812 allows for the system (100) to more effectively deploy an additional instance of the same application without performing the analysis of blocks 802 through 806 with regard to the dynamic binding policies. The processor (202) defines (block 814) a number of packages that reference the same model as created at block 802. Thus, block 814 allows for the system (100) to outline a number of potential deployment packages of the application in the external network, and potentially reuse those packages whenever the same model is created at block 802.

Figure 10:
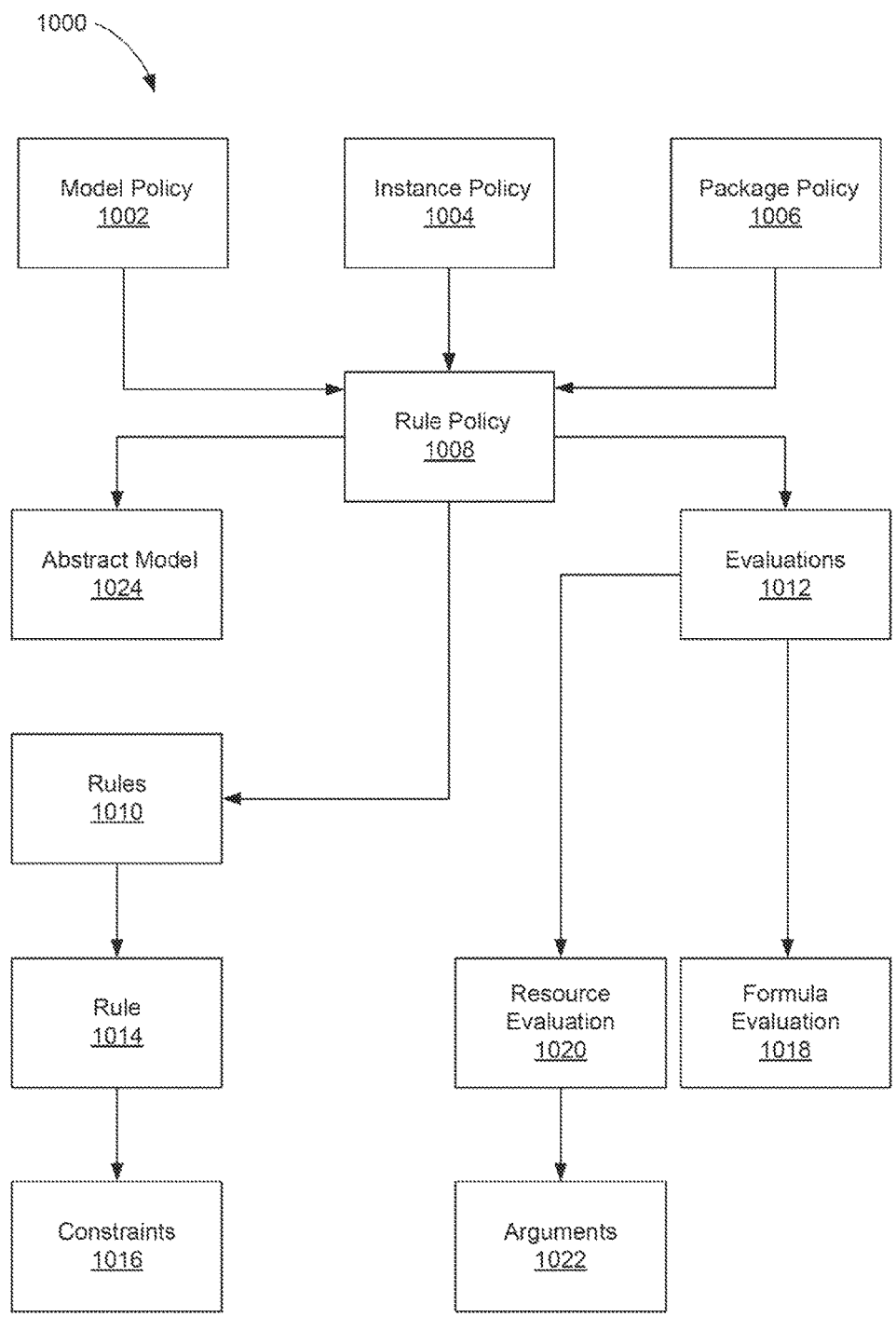
FIG. 10 is a block diagram of a dependency graph depicting a dependency of a number of rules within the policies, according to another example of the principles described herein.

At block 816, the rules used to create the number of dynamic binding policies are compiled. This places the rules in condition for execution by the processor (202) when filtering out potential candidate cloud computing service providers, dynamic binding policies are policies based on a number of rules. The rules are profiles of the policy, and assist an administrator in making decisions when several cloud computing resource providers are providing several of the same kind of resources. The resources may be divided into three sub-types: model policies (1002), instance policies (1004), and package policies (1006). FIG. 10 is a block diagram of a dependency graph (1000) depicting a dependency of a number of rules within the policies, according to another example of the principles described herein.

As depicted in FIG. 10, the model policies (1002), instance policies (1004), and package policies (1006) make up the rule policies (1008). Model policies (1002) are used to assist in selecting a sub-type of a substitution point in the models described above. Instance policies (1004) are used to assist in selecting existing instances of application deployment in an external network that can be reused as described above in connection with block 812 of FIGS. 8 and 9. Package policies (1006) are used to select the best fit package from a number of packages that reference to the same model as described above in connection with block 814 of FIGS. 8 and 9.

The rule policies (1008) inherit the model policies (1002), instance policies (1004), and package policies (1006) and are composed of a set of rules (1010) and a set of evaluations (1012). The rules (1010) contain several rules (1014) and each rule (1014) is composed of several predicates or constraints (1016). The evaluations (1012) define the way to get the values that are used as the constraints (1016) within the rules (1014). Evaluations (1012) comprise two sub-types: a formula evaluations (1018) and resource evaluations (1020). The formula evaluations (1018) define the formula to calculate the value of the constraints (1016), and the resource evaluations (1020) define the functions used to get the value of the constraints (1016). The resource evaluations (1020) define a number of arguments (1022) to be used within the method of FIGS. 6 through 9 in determining the best resources of the candidate cloud computing service providers.

Because the policies are used to choose the best resource from among the resources provided by the cloud computing resource providers, the system uses the static binding policies and dynamic binding policies to filter through potential resources provided by the cloud computing resource providers as candidates to get a best matching resource provided by the best matching cloud computing resource provider. Turning again to FIGS. 8 and 9, the processor (202) receives (block 818) input regarding the dynamic binding policies. The processor (202) stores (block 820) the static binding policies (255) and the dynamic binding policies (265) in, for example, the data storage device (204) of the cloud management device (102).

The processor (202) uses the substitution module (240) to bind (block 822) a number of the substitution points by informing a provisioning system that portions of the model created at block 802 will be substituted with a sub-type. The policy execution module (270) is executed by the processor (202) to determine (block 824) a number of resource candidates for scaling.

The processor (202) uses the policy execution module (270) to apply (block 826) policies to filter candidates. The processor (202) returns (block 828) a number of matching candidates that will provide the resources to horizontally scale the application (124) to the external network (106). In one example, only one candidate is returned. In another example, more than one candidate is returned. In this example, an administrator may simply choose from any of the multiple candidates returned.

The system (100) acquires and utilizes (block 830) the resources of the matching candidate cloud computing service provider. Block 830 may include entering into a contract with the candidate cloud computing service provider, and horizontally scaling the application (124) into the candidate cloud computing service provider's network.

To follow are several examples of XML code resource examples and rule language examples. As described above, the candidates are the input and output of the policy execution module (270). The term "candidates" represents all the candidates input as potential cloud computing service providers, and "candidate" represents each individual candidate in the below examples. Other than the policies and other information known by the policy execution module (270), the below examples utilize other information such as current orderKey, current model reference key, current root resource, and target resource, among others. This additional information is known by the system (100) and are not changed. This additional information is global data.

In one example, rules can also have relationship between themselves. In this example, a rule's action also can be to execute another rule. For example:
Rule rule1: when predicate1 then rule2
Rule rule2: when predicate2 then candidate
Rules may also have priority from 0 to infinity. The larger the number, the higher the priority of that rule. In one example, 0 is the default priority number. For example
Rule rule1 Priority 1: when predicate1 then candidate
Rule rule2 Priority 0: when predicate2 then candidate
Predicate logic is a generic term for symbolic formal systems like first-order logic, second-order logic, many-sorted logic, or infinite logic. The formal system of the present application is distinguished from other systems in that its formula contains variables which can be quantified. Predicate calculus symbols may represent either variables, constants, functions or predicates. Constants name specific objects or properties in the domain of discourse. Thus, George, tree, tall and blue are examples of well formed constant symbols. The constants (true) and (false) are sometimes included.

Variable symbols are used to designate general classes, objects, or properties in the domain of discourse. Functions denote a mapping of a number of elements in a set (called the domain of the function) into a unique element of another set (the range of the function). Elements of the domain and range are objects in the world of discourse. Every function symbol has an associated arity, indicating the number of elements in the domain mapped onto each element of range.

In rule policy, constants are usually numbers, a resource's type, or a resource element's desired value. Variables are usually the global data, or input data of the policy execution module (270). For easy of explanation, some keywords may be defined to represent the variables such as, for example, "OrderKey," and "Target."

Functions are the function provided by instance, model, static binding policy, and package resources. These functions are used to assist in obtaining the elements' values. Functions also can be the formula calculations, the composition of constants, variables, or functions. The keywords "Maximum" and "Minimum" may be defined as one kind of function.

Constants and variables may be defined in the predicate logic directly. The functions may be complex, the evaluations (918, 920) are provided to express them. In the predicate logic, the variable may be used to represent these functions. For example, Predicate: cpu is greater than 5; cpu is the variable to represent function defined below.

Evaluation: cpu is getAttributeValue (instance, attributename, tag)

Function also can conclude the function. For example,
Predicate: value is Maximum;
Evaluation: value is formula (0.5\*cpu \0.5*memory);
cpu is getAttributeValue(instance, attributename, tag)   \---> in predicate calculus, the attributename will bind to "cpu"
memory is getAttributeValue(instance, attributename, tag)  \-> in predicate calculus, the attributename will bind to "memory"

Thus, the policy execution module (270) has two parts; a compiler part, and a run-time part. According to the policy and predicate feature and the relationship between predicates, the associations between rules are constructed in the compiler phase. The predicate calculus and rule mapping are processed at the run-time phase. Thereafter, the rule priority is handled.

To follow is an XML Resource example:

```
<?xml version="1.0" encoding="ISO-8859-1" standalone="yes"?>
<ns3:WModelCollection xmlns:ns2="http://esit.hp.com/0.1/models/k-models" xmlns=
"http://esit.hp.com/0.1/models/b-models"
xmlns:ns4="http://esit.hp.com/0.1/models/p-models" xmlns:ns3=
"http://esit.hp.com/0.1/models/w-models">
<ns3:version>0</ns3:version>
    <ns3:modus xsi:type="ns4:InstancePolicy"
xmlns:xsi="http://www.w3.org/2001/XMLSchema-instance">
    <ns3:id>4febdf7eb4888aee162c72c5</ns3:id>
        <ns3:version>1</ns3:version>
        <ns3:dateRecordAdded>2012-06-
28T12:38:20.959+08:00</ns3:dateRecordAdded>
        <ns3:dateLastModified>2012-06-
28T12:38:20.959+08:00</ns3:dateLastModified>
```

-continued

```
<ns3:policyKey>
    <allowRefinement>false</allowRefinement>
    <ns3:xkey>com.hp.rule.hypervisor.policy</ns3:xkey>
</ns3:policyKey>
<ns3:active>false</ns3:active>
<ns4:modelKey>
    <allowRefinement>false</allowRefinement>
    <ns3:xkey>com.hp.esa.infra.vm.HyperVisor</ns3:xkey>
</ns4:modelKey>
<ns4:rules>
    <ns4:rule>
        <ns4:conditions>
            <ns4:predicate xsi:type="KOr">
                <exp xsi:type="Eq">
                    <value xsi:type="PrimitiveValue">
                        <allowRefinement>false</allowRefinement>
                        <value>Maximum</value>
                    </value>
                    <ref>
                        <allowRefinement>false</allowRefinement>
                        <pointer>
                            <exp>formulaeval</exp>
                        </pointer>
                    </ref>
                </exp>
                <exp xsi:type="Geq">
                    <value xsi:type="PrimitiveValue">
                        <allowRefinement>false</allowRefinement>
                        <value>0.6</value>
                    </value>
                    <ref>
                        <allowRefinement>false</allowRefinement>
                        <pointer>
                            <exp>formulaeal</exp>
                        </pointer>
                    </ref>
                </exp>
            </ns4:predicate>
        </ns4:conditions>
        <ns4:name>rule1</ns4:name>
        <ns4:value xsi:type="PrimitiveValue">
            <allowRefinement>false</allowRefinement>
            <value>Candidate</value>
        </ns4:value>
        <ns4:priority>1</ns4:priority>
    </ns4:rule>
</ns4:rules>
<ns4:evaluations>
    <ns4:evaluation xsi:type="ns4:FormulaEvaluation">
        <ns4:name>formulaeval</ns4:name>
        <ns4:value>
            <allowRefinement>false</allowRefinement>
            <parameters xsi:type="FormulaValueDefinition">
                <allowRefinement>false</allowRefinement>
                <parameters xsi:type="PrimitiveValue">
                    <allowRefinement>false</allowRefinement>
                    <value>0.5</value>
                </parameters>
                <parameters xsi:type="Reference">
                    <allowRefinement>false</allowRefinement>
                    <pointer>
                        <exp>cpu</exp>
                    </pointer>
                </parameters>
                <operator>*</operator>
            </parameters>
            <parameters xsi:type="FormulaValueDefinition">
                <allowRefinement>false</allowRefinement>
                <parameters xsi:type="PrimitiveValue">
                    <allowRefinement>false</allowRefinement>
                    <value>0.5</value>
                </parameters>
                <parameters xsi:type="Reference">
                    <allowRefinement>false</allowRefinement>
                    <pointer>
                        <exp>memory</exp>
                    </pointer>
                </parameters>
                <operator>*</operator>
```

-continued

```
            </parameters>
            <operator>+</operator>
        </ns4:value>
    </ns4:evaluation>
    <ns4:evaluation xsi:type="ns4:ResourceEvaluation">
        <ns4:name>memory</ns4:name>
        <ns4:type>Instance</ns4:type>
        <ns4:method>getAttributeValue</ns4:method>
        <ns4:argumentlist>instance</ns4:argumentlist>
        <ns4:argumentlist>attributename</ns4:argumentlist>
        <ns4:argumentlist>tag</ns4:argumentlist>
        <ns4:queryConditions>
            <ns4:argument>
                <ns4:name>instance</ns4:name>
                <ns4:type>com.amazonaws.services.autoscaling.model.Instance</ns4:type>
                <ns4:value xsi:type="PrimitiveValue">
                    <allowRefinement>false</allowRefinement>
                    <value>candidate</value>
                </ns4:value>
            </ns4:argument>
            <ns4:argument>
                <ns4:name>attributename</ns4:name>
                <ns4:type>java.lang.String</ns4:type>
                <ns4:value xsi:type="PrimitiveValue">
                    <allowRefinement>false</allowRefinement>
                    <value>memory</value>
                </ns4:value>
            </ns4:argument>
            <ns4:argument>
                <ns4:name>tag</ns4:name>
                <ns4:type>java.lang.String</ns4:type>
                <ns4:value xsi:type="PrimitiveValue">
                    <allowRefinement>false</allowRefinement>
                    <value>Observed</value>
                </ns4:value>
            </ns4:argument>
        </ns4:queryConditions>
    </ns4:evaluation>
    <ns4:evaluation xsi:type="ns4:ResourceEvaluation">
        <ns4:name>cpu</ns4:name>
        <ns4:type>Instance</ns4:type>
        <ns4:method>getAttributeValue</ns4:method>
        <ns4:argumentlist>instance</ns4:argumentlist>
        <ns4:argumentlist>attributename</ns4:argumentlist>
        <ns4:argumentlist>tag</ns4:argumentlist>
        <ns4:queryConditons>
            <ns4:argument>
                <ns4:name>instance</ns4:name>
                <ns4:type>com.amazonaws.services.autoscaling.model.Instance</ns4:type>
                <ns4:value xsi:type="PrimitiveValue">
                    <allowRefinement>false</allowRefinement>
                    <value>candidate</value>
                </ns4:value>
            </ns4:argument>
            <ns4:argument>
                <ns4:name>attributename</ns4:name>
                <ns4:type>java.lang.String</ns4:type>
                <ns4:value xsi:type="PrimitiveValue">
                    <allowRefinement>false</allowRefinement>
                    <value>cpu</value>
                </ns4:value>
            </ns4:argument>
            <ns4:argument>
                <ns4:name>tag</ns4:name>
                <ns4:type>java.lang.String</ns4:type>
                <ns4:value xsi:type="PrimitiveValue">
                    <allowRefinement>false</allowRefinement>
                    <value>Observed</value>
                </ns4:value>
            </ns4:argument>
        </ns4:queryConditions>
    </ns4:evaluation>
</ns4:evaluations>
</ns3:modus>
<ns3:modus xsi:type="ns4:ModelPolicy"
    xmlns:xsi="http://www.w3.org/2001/XMLSchema-instance">
<ns3:id>4fe96c34b4887b47c60e83e6</ns3:id>
<ns3:version>1</ns3:version>
<ns3:dateRecordAdded>2012-06-28T12:37:18.467+08:00</ns3:dateRecordAdded>
<ns3:dateLastModified>2012-06-28T12:37:18.467+08:00</ns3:dateLastModified>
<ns3:policyKey>
    <allowRefinement>false</allowRefinement>
    <ns3:xkey>com.hp.rule.policy</ns3:xkey>
</ns3:policyKey>
<ns3:active>false</ns3:active>
<ns4:modelKey>
    <allowRefinement>false</allowRefinement>
    <ns3:xkey>com.hp.cc.shared.os.OS</ns3:xkey>
</ns4:modelKey>
<ns4:rules>
    <ns4:rule>
        <ns4:conditions>
            <ns4:predicate xsi:type="Eq">
                <value xsi:type="PrimitiveValue">
                    <allowRefinement>false</allowRefinement>
                    <value>ECS</value>
                </value>
                <ref>
                    <allowRefinement>false</allowRefinement>
                    <pointer>
                        <exp>eval1</exp>
                    </pointer>
                </ref>
            </ns4:predicate>
            <ns4:predicate xsi:type="Eq">
                <value xsi:type="PrimitiveValue">
                    <allowRefinement>false</allowRefinement>
                    <value>com.hp.esa.os.ubuntu.Ubuntu</value>
                </value>
                <ref>
                    <allowRefinement>false</allowRefinement>
                    <pointer>
                        <exp>eval2</exp>
                    </pointer>
                </ref>
            </ns4:predicate>
        </ns4:conditions>
        <ns4:name>rule1</ns4:name>
        <ns4:value xsi:type="PrimitiveValue">
            <allowRefinement>false</allowRefinement>
            <value>candidate</value>
        </ns4:value>
        <ns4:priority>1</ns4:priority>
    </ns4:rule>
</ns4:rules>
<ns4:evaluations>
    <ns4:evaluation xsi:type="ns4:ResourceEvaluation">
        <ns4:name>eval1</ns4:name>
        <ns4:type>BindingPolicy</ns4:type>
        <ns4:method>getBindingPolicyProvider</ns4:method>
        <ns4:argumentlist>name</ns4:argumentlist>
        <ns4:argumentlist>orderkey</ns4:argumentlist>
        <ns4:queryConditions>
            <ns4:argument>
                <ns4:name>name</ns4:name>
                <ns4:type>java.lang.String</ns4:type>
                <ns4:value xsi:type="PrimitiveValue">
                    <allowRefinement>false</allowRefinement>
                    <value>Infrastructure_Provider</value>
                </ns4:value>
            </ns4:argument>
            <ns4:argument>
                <ns4:name>orderkey</ns4:name>
                <ns4:type>java.lang.String</ns4:type>
                <ns4:value xsi:type="Reference">
                    <allowRefinement>false</allowRefinement>
                    <pointer>
                        <exp>OrderKey</exp>
                    </pointer>
                </ns4:value>
            </ns4:argument>
        </ns4:queryConditions>
    </ns4:evaluation>
    <ns4:evaluation xsi:type="ns4:ResourceEvaluation">
```

-continued

```
        <ns4:name>eval2</ns4:name>
        <ns4:type>Model</ns4:type>
        <ns4:method>getModelKeyValue</ns4:method>
        <ns4:argumentlist>candidate</ns4:argumentlist>
        <ns4:queryConditions>
            <ns4:argument>
                <ns4:name>candidate</ns4:name>
                <ns4:type>com.hp.esit.models.kmodels.Model</ns4:type>
                <ns4:value xsi:type="PrimitiveValue">
                    <allowRefinement>false</allowRefinement>
                    <value>candidate</value>
                </ns4:value>
            </ns4:argument>
        </ns4:queryConditions>
        </ns4:evaluation>
    </ns4:evaluations>
  </ns3:modus>
</ns3:WModelCollection>
Rule language example:
namespace com.hp.hpcc.rulepolicy
ModelPolicy os for com.hp.Shared.os.OS{
    Rule rule1 Priority 1: when eval1 is "ECS" and eval2 is
"com.hp.Shared.os.Windows" then
"candidate"
    Rule rule2 priority 2: when eval1 is "EC2" and eval2 is
"com.hp.Shared.os.Ubuntu" then
"candidate"
    ResourceEvaluation eval1 is
bindingpolicyEvaluation.getBindingPolicyProvider(name, orderkey)
with arguments{
        name is "Infrastructure_Provider",
        orderkey is OrderKey
    }
    ResourceEvaluation eval2 is Model.getModelKeyValue(model) with
arguments{
        model is "candidate"
    }
}
namespace com.hp.hpcc.rulepolicy.hypervisor
InstancePolicy hypervisor for com.hp.cc.Hypervisor{
Rule rule1 Priority 1 : when feval is Maximum then Candidate
FormulaEvaluation feval is Formula { cpu * 0.5 + memory * 0.5};
/*cpu, and memory will defined in ResourceEvalvation.*/
ResourceEvaluation cpu is InstanceEvaluation.getAttributeValue(in-
stance, attributename, tag) with arguments{
    instance is candidate,
    attributename is "cpu",
    tag is "Observed"
}
ResourceEvaluation memory is
InstanceEvaluation.getAttributeValue(instance,attributename,tag) with
arguments{
    instance is candidate,
    attributename is "memory",
    tag is "Observed"
}
}
```

Like the load balancers (127, 147), the global load balancer (170) comprises a set of policies that define where transaction requests are directed. In this manner, the global load balancer (170) distributes workloads across the system (100) or other resources to achieve optimal resource utilization, maximize throughput, minimize response time, and avoid overload. The global load balancer (170) further acts as the load balancer for network B (106) during execution of applications that have been horizontally scaled to network B (106). In one example, the policies within the global load balancer (170) may be updated in order to redirect traffic from network A (104) to network B (106), or visa versa. In one example, the processor (FIG. 2, 202) of the cloud management device (102) has access to and may control the global load balancer (170).

The methods described above can be accomplished by a computer program product comprising a computer readable medium having computer usable program code embodied therewith that when executed performs the above methods. Specifically, the computer usable program code may creating a model of an application, define a number of substitution points within the model, express the substitution points as abstract models with a set of sub-types, and codify a number of policies that express which sourcing option to use for each substitution point.

The computer usable program code may further receive a request to instantiate a model, apply a number of the policies to select a resource candidate, and acquiring resources of a selected candidate.

Further, the computer usable program code may, when executed by a processor, perform the processes described above in connection with FIGS. 3 through 10. In one example, the computer readable medium is a computer readable storage medium, as described above. In this example, the computer readable storage medium may be a tangible or non-transitory medium.

The specification and figures describe a method and system of network resource management. The method comprises, with a processor, creating a model of an application, defining a number of substitution points within the model, expressing the substitution points as abstract models with a set of sub-types, and codifying a number of policies that express which sourcing option to use for each substitution point. The methods may further comprise receiving a request to instantiate a model, applying a number of the policies to select a resource candidate, and acquiring resources of a selected candidate. These systems and methods may have a number of advantages, including: (1) assisting an administrator in determining which applications utilized within an internal network may be deployed in an external network using cloud bursting techniques (2) assisting an administrator in determining how that particular application may be deployed within the external network.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of network resource management, the method being implemented by a physical processor that executes machine readable instructions, the method comprising:
   responsive to determining that a scalable cloud application is to be scaled from a first network to a second network, creating a model of the scalable cloud application by:
      defining a set of substitution points within the model, wherein each substitution point comprises information about a set of requirements for the model at the substitution point and a set of resource candidates that could be used to satisfy the set of requirements; and
      codifying a set of policies that express which sourcing option to use for each substitution point;
   determining, based on the set of policies and the set of substitution points, a set of sources that comprise resources used to deploy the scalable cloud application;
   instantiating the scalable cloud application in the second network based on the model; and
   during instantiation of the scalable cloud application in the second network, receiving an indication of a first resource from the set of sources to use at a first substitution point in deployment of the scalable cloud application.

2. The method of claim 1, further comprising:
receiving a request to instantiate the scalable cloud model; and
acquiring a subset of resources of a selected source for instantiation of the scalable cloud model, wherein the subset of resources includes the first resource and the selected source comprises a first cloud network.

3. The method of claim 2, wherein acquiring resources comprises:
executing the set of policies to determine the selected source that comprises the subset of resources which matches the set of requirements of a substitution point; and
acquiring a second subset of resources from a second selected source, wherein the second selected sources comprises a second cloud network separate from the first cloud network.

4. The method of claim 1, further comprising:
responsive to determining that the substitution point comprises information about a single resource, storing the information about the single resource as a static binding policy; and
responsive to determining that the substitution point does not comprise information about a single resource, creating a dynamic binding policy for the substitution point.

5. The method of claim 4, in which creating the dynamic binding policy comprises:
defining a set of parameters to select a corresponding set of resource candidates to match a corresponding set of requirements of the substitution point;
compiling a set of rules to score the corresponding set of resource candidates at run-time to determine a subset of resource candidates for use at the substitution point; and
storing the dynamic binding policy, wherein the dynamic binding policy comprises the set of parameters and the set of rules.

6. The method of claim 1, further comprising:
informing a provisioning system that a portion of the model will be substituted based on a corresponding substitution point.

7. The method of claim 1, further comprising:
determining, based on the set of substitution points, the set of resource candidates for scaling of the scalable cloud application.

8. The method of claim 7, further comprising:
applying the static binding policy and the dynamic binding policy to filter the set of resource candidates; and
providing information about a subset of the resource candidates that match the static binding policy and the dynamic binding policy.

9. The method of claim 1, wherein instantiating the scalable cloud application comprises:
instantiating the model of the scalable cloud application to facilitate scaling up the scalable cloud application using the set of sources.

10. A cloud management device, comprising:
a physical processor that implements machine readable instructions that cause the cloud management device to:
create a model of a scalable cloud application responsive to determining that the scalable cloud application is to be scaled from a first network to a second network;
define a set of substitution points within the model, wherein each substitution point comprises information about a set of requirements for the model at the substitution point and a set of resource candidates that could be used to satisfy the set of requirements;
apply a set of policies comprising a scoring function evaluated at runtime to determine a set of resources from the set of resource candidates to implement the scalable cloud application;
provide information to a source that comprises the set of resources to facilitate implementation of the scalable cloud application;
instantiate the scalable cloud application in the second network based on the model; and
during instantiation of the scalable cloud application in the second network, receive an indication of a first resource from the set of sources to use at a first substitution point in deployment of the scalable cloud application.

11. The cloud management device of claim 10, wherein the physical processor implements machine readable instructions that cause the device to:
execute, for a substitution point, a static binding policy and a dynamic binding policy to filter a set of resource candidates that match the set of requirements of the substitution point.

12. The cloud management device of claim 10, in which the cloud management device is incorporated into a first cloud network from which the application is to be scaled from, wherein the cloud management device is communicably coupled to a second network separate from the first network, and wherein a first subset of the set of resources are from the first cloud network and a second subset of the set of resources are from a second cloud network separate from the first cloud network.

13. A non-transitory machine readable storage medium comprising machine readable instructions which, when executed by a physical processor, cause a computing device to:
create a model of a scalable cloud application responsive to determining that the scalable cloud application is to be scaled from a first network to a second network;
define a set of substitution points within the model, wherein each substitution point comprises information about a set of requirements for the model at the substitution point and a set of resource candidates that could be used to satisfy the set of requirements;
create a set of policies comprising a scoring function evaluated at runtime to determine a set of resources from the set of resource candidates to implement the scalable cloud application; and
provide information to a set of sources that comprises the set of resources to facilitate implementation of the scalable cloud application;
instantiate the scalable cloud application in the second network based on the model; and
during instantiation of the scalable cloud application in the second network, receive an indication of a first resource from the set of sources to use at a first substitution point in deployment of the scalable cloud application.

14. The non-transitory machine readable storage medium of claim 13, further comprising machine readable instructions which, when executed by a physical processor, cause a computing device to:

execute, for a substitution point, a static binding policy and a dynamic binding policy to filter a set of resource candidates that match the set of requirements of the substitution point.

15. The non-transitory machine readable storage medium of claim 13, further comprising machine readable instructions which, when executed by a physical processor, cause a computing device to:

determine, based on the set of policies and the set of substitution points, the set of sources that comprise the set of resources to deploy the scalable cloud application, wherein a first subset of the set of resources are from the first cloud network and a second subset of the set of resources are from a second cloud network separate from the first cloud network.

16. The non-transitory machine readable storage medium of claim 15, further comprising machine readable instructions which, when executed by a physical processor, cause a computing device to:

receive a request to instantiate the scalable cloud model; and acquire a subset of resources of a selected source for instantiation of the scalable cloud model.

17. The non-transitory machine readable storage medium of claim 15, further comprising machine readable instructions which, when executed by the physical processor, cause the computing device to:

implement the model of the scalable cloud application to facilitate scaling up the scalable cloud application in the set of sources.

18. The non-transitory machine readable storage medium of claim 13, further comprising machine readable instructions which, when executed by the physical processor, cause the computing device to:

inform a provisioning system that a portion of the model will be substituted based on a corresponding substitution point.

19. The cloud management device of claim 10, wherein the physical processor implements machine readable instructions that cause the device to:

receive a request to instantiate the scalable cloud model; and acquire a subset of resources of a selected source for instantiation of the scalable cloud model, wherein the subset of resources includes the first resource.

20. The cloud management device of claim 10, wherein the physical processor implements machine readable instructions that cause the device to instantiate the scalable cloud application by:

instantiating the model of the scalable cloud application to facilitate scaling up the scalable cloud application using the set of sources.

* * * * *